Figure 1:
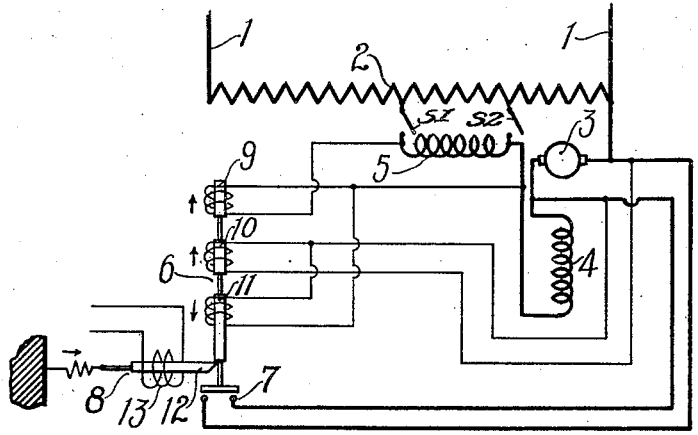

R. E. HELLMUND
CONTROL SYSTEM FOR SINGLE PHASE MOTORS.
APPLICATION FILED FEB. 19, 1914.

1,224,166.

Patented May 1, 1917.

WITNESSES:
R. J. Fitzgerald
W. R. Coley

INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR SINGLE-PHASE MOTORS.

1,224,166.  Specification of Letters Patent.   Patented May 1, 1917.

Application filed February 19, 1914. Serial No. 819,738.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Control Systems for Single-Phase Motors, of which the following is a specification.

My invention relates to dynamo-electric machines, and it has special reference to means for operating alternating current motors of the commutator type.

One object of my invention is to provide means for automatically aiding the acceleration of a motor of the above-indicated type and simultaneously maintaining good commutating conditions therein.

Another object of my invention is to provide means of the above-indicated character which shall be simple and inexpensive in construction, and reliable and effective in operation.

Inasmuch as the speed of an alternating current motor of the commutator type is directly proportional to the combined voltages of the armature winding and the closely allied auxiliary or inducing field winding, and inversely proportional to the voltage of the main or exciting field winding, it follows that, if commutating flux values in the machine are varied in accordance with the ratio referred to, that is, indirectly in proportion to the change in motor speed, the commutating conditions will be good throughout the starting period of the motor, and sparking and flashing troubles heretofore experienced in the operation of machines of the type in question will be obviated.

According to my present invention, I provide an alternating-current single-phase motor that is adapted to start as a repulsion motor, that is to say, with the armature winding initially short-circuited, and an electro-responsive device that is differentially subjected to the combined influence of the armature and the inducing field windings and of the exciting field winding, and that is adapted to automatically open the short-circuit of the armature, at the proper time, to further accelerate the motor and to simultaneously maintain good commutating conditions in the machine.

In one form, my invention comprises the combination with an alternating current motor of the commutator type, of an electro-responsive device, such as a relay, having three cores, the coils of which are independently connected to the armature winding and the two field windings of the motor. The coils are connected in such manner that those associated with the armature and with the inducing field winding are adapted to exert a pull in one direction, and the coil connected to the exciting winding is adapted to exert a pull in the opposite direction.

In modifications of my invention, I employ a relay having two cores, the coil of one of which is connected across the exciting field winding and the other coil is connected either across the inducing field winding and the armature winding, or across the inducing field winding and in series with the secondary winding of a transformer, the primary winding of which is connected across the armature. A switch for normally short circuiting the armature winding is secured to the cores of the relay, in each form of my invention.

In addition, a suitable device for holding the short-circuiting switch open, when it has once been actuated by the relay, is also provided.

Figure 2:
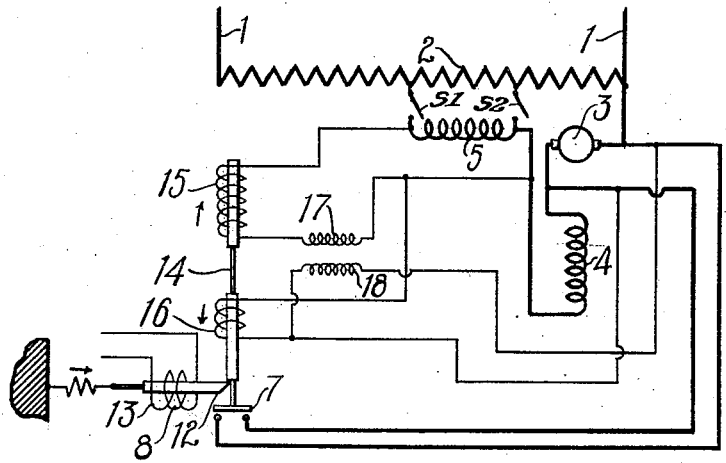
Figure 3:
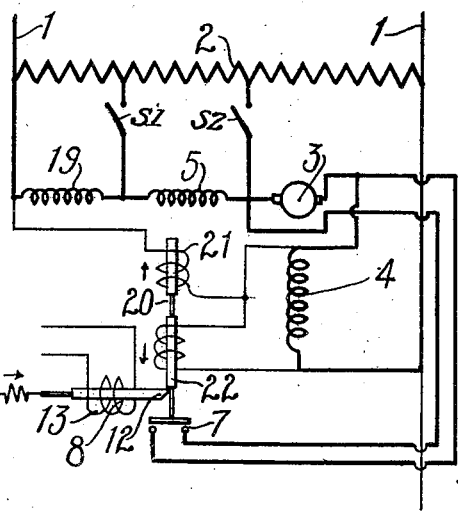

In the accompanying drawing, Figure 1 is a diagrammatic view of a control system embodying my invention, and Figs. 2 and 3 are similar views of modifications thereof.

Referring to the drawings, the system here shown comprises a supply circuit 1; a suitable auto-transformer 2, or the equivalent, connected thereto; an alternating current motor of the commutator type having an armature winding 3, a main exciting field winding 4, and an auxiliary or inducing field winding 5; a plurality of main-circuit switches S¹ and S²; an electro-responsive device 6 connected to the motor, as hereinafter described; a switch 7 associated with the device 6 for normally short-circuiting the armature winding 3; and an interlocking device 8 associated with the switch 7.

The electro-responsive device 6 is provided with three cores 9, 10 and 11; the actuating winding for the core 9 is connected across the inducing field winding 5 and, as shown in the drawing, is adapted to exert an upward pull on the core. The actuating coil for the core 10 is connected across the armature winding 3 and is also adapted to exert an upward pull. The actuating coil for the core 11 is connected across the exciting field winding 4 and is adapted to exert a downward pull on the cores. It will thus be observed that the electroresponsive device 6 is subjected differentially to the combined action of the armature winding and the closely related inducing field winding and to the action of the main field winding 4. The inducing field winding, by its familiar transformer action, inductively impresses voltage upon the armature, and, consequently, the combined armature and inducing field-winding voltages may be referred to as the total armature working voltage, taking phase displacement and the transformer ratio into account.

The interlocking device 8 may be of any suitable and well-known construction for holding the movable member of the switch 7 and its mechanically associated cores 9, 10 and 11 in open-circuit position. The device 8, as shown, comprises a spring-pressed rod 12 for engaging the movable member of the switch 7 and an actuating coil 13 for moving the rod 12 in opposition to its biasing spring to permit the switch to close.

Reference may now be had to Fig. 2, in which is shown an electro-responsive device 14 comprising two movable cores 15 and 16. The coil for the core 16 is connected across the exciting field winding 4 and the coil for the core 15 is connected across the inducing field winding 5 and is in series with the secondary winding 17 of a series transformer, the primary winding 18 of which is connected across the armature winding 3. The coil for the core 15 is adapted to exert a pull in an upward direction and the coil for core 16 is arranged to exert a downward pull on the core. In this way, a differential action between the armature winding and the related inducing winding and the exciting winding, is secured to the electro-responsive device 14. The remaining portions of the system shown are similar to those described in connection with Fig. 1.

Referring now to Fig. 3, the system shown comprises a motor embodying the features of those shown in Figs. 1 and 2, and, in addition, having an auxiliary interpole winding 19 connected to the inducing winding 5 for commutating purposes. An electro-responsive device 20 comprises two movable cores 21 and 22, the coil for the core 21 being connected across the interpole and inducing field windings 19 and 5 and the armature winding 3, and the coil for the core 22 being connected across the exciting field winding 4. As in the systems hereinbefore described, the coils are arranged to pull in opposite directions. The interlocking device 8 is again provided, as described with reference to Fig. 1.

The operation of the system of Fig. 1 may be described as follows: Energy from any suitable external source is first momentarily supplied to the coil 13 of the interlocking device 8 for actuating the rod 12 to allow the movable member of the switch 7 to drop to its closed position, thus initially short-circuiting the armature 3. Alternating current of a suitable potential is then supplied from the auto-transformer 2, the switch $S^1$ being closed for starting the motor. When the combined voltages of the accelerating armature winding 3 and of the inducing winding 5 have risen to a sufficient value to overcome the action of the electro-motive force impressed across the exciting field winding 4, the electro-responsive device 6 will be actuated to its upper position and will subsequently be held in that position by the spring-pressed rod 12. In this way, the motor is initially accelerated as a repulsion motor and, when operating conditions are correct, as hereinbefore explained, the motor is automatically changed over from a repulsion-type motor, the switch $S^2$ preferably being closed at this time to provide the "doubly-fed" connection, in accordance with a familiar practice; thus, the motor is suitably accelerated and, at the same time, the commutating flux therein is maintained at a proper value during the starting operation.

It is believed that the operation of the systems of Figs. 2 and 3 will be understood in connection with the above description and, consequently, no extended further account will be given here. In the system shown in Fig. 3, the switches $S^1$ and $S^2$ may be operated substantially simultaneously with the actuation of the electro-responsive device 20, or $S^2$ may be operated at that time and $S^1$ subsequently, depending upon the design of the motor and the commutating conditions that obtain, in accordance with a familiar practice. Moreover, it will be understood by those skilled in the art that electro-responsive devices similar to those described above may be readily adapted for other purposes, such as cutting off the supply of energy, or setting the vehicle brakes. Furthermore, although, for illustrative purposes, I have disclosed the electro-responsive devices as adapted to perform only one operation and then to be held inoperative by the interlocking device 8, it should be observed that the electro-responsive devices may be employed, if desired, to effect other or subsequent circuit changes and acts.

Variations in the circuit connections and in the arrangement of parts may be made within the spirit and scope of my invention, and I desire that only such limitations shall be imposed as are indicated in the appended claims.

I claim as my invention:

1. The combination with a supply circuit, and a dynamo-electric machine operated therefrom and having an armature winding and an exciting and an inducing field winding, of electro-responsive means adapted to be differentially acted upon in accordance with the respective voltages of one of said field windings and of the remaining windings, to automatically accelerate the machine and to simultaneously maintain good commutating conditions therein.

2. The combination with a supply circuit and an alternating current motor of the commutator type operated therefrom and having an initially short-circuited armature winding and an exciting and an inducing field winding, of electro-responsive means adapted to be differentially acted upon in accordance with the respective voltages of said exciting field winding and of the combined armature and inducing field windings, during the starting of the motor, to automatically remove the armature short-circuit to further accelerate the motor and to simultaneously maintain good commutating conditions therein.

3. The combination with a supply circuit and a dynamo-electric machine of the commutator type connected thereto and having an armature winding and an exciting and an inducing field winding, of automatic means comprising a coil conductively connected to said exciting field winding and a coil conductively connected to said inducing field winding for varying the commutating flux in the machine in accordance with the relation existing between the exciting field strength and the total armature working voltage.

4. The combination with a supply circuit and a dynamo-electric machine of the commutator type connected thereto and having an armature winding and an exciting and an inducing field winding, of automatic switching means for varying circuit connections to vary the commutating flux in the machine, said means being actuated in accordance with the differential relation existing at a predetermined time between the exciting field strength and the total armature working voltage.

5. The combination with a dynamo-electric machine having an armature winding and an exciting and an inducing field winding, of a switching device for making certain circuit connections, and actuating means therefor energized substantially in accordance with the additively combined voltages of the armature and the inducing field winding minus the voltage of the exciting field winding.

6. The combination with a dynamo-electric machine having an armature winding and an exciting and an inducing field winding, of a switching device for making certain circuit connections, and two actuating coils therefor, one of said coils is conductively energized from said exciting field winding and the other one of said coils is energized from said inducing field winding.

7. The combination with a dynamo-electric machine of the commutator type having an armature winding and an exciting and an inducing field winding, of a switching device for making certain circuit connections, and two actuating coils therefor, one of said actuating coils is conductively energized from the inducing field winding and is inductively energized from the armature winding and the other actuating coil is conductively energized from the exciting field winding.

8. The combination with a supply circuit and an alternating-current dynamo-electric machine of the commutator type having an armature winding and an exciting and an inducing field winding, of a switching device for varying the commutating flux in the machine under predetermined conditions, two actuating coils therefor, one of said coils is directly energized from the inducing field winding, and the other coil is directly energized from the exciting field winding, and a transformer having its primary winding directly energized from the armature winding and its secondary winding connected in circuit with the first mentioned actuating coil.

In testimony whereof, I have hereunto subscribed my name this 14th day of Feb., 1914.

RUDOLF E. HELLMUND.

Witnesses:
B. B. HINES,
M. C. MERZ.